United States Patent [19]

Lasher et al.

[11] Patent Number: 5,121,246

[45] Date of Patent: Jun. 9, 1992

[54] INTENSITY DEPENDENT BEAM DEFLECTOR

[75] Inventors: Mark E. Lasher; Debra M. Gookin, both of San Diego, Calif.

[73] Assignee: The United States of America as represented by the Secretary of the Navy, Washington, D.C.

[21] Appl. No.: 460,419

[22] Filed: Jan. 3, 1990

[51] Int. Cl.⁵ .......................... G02F 1/29; G01J 1/100
[52] U.S. Cl. ..................................... 359/288; 359/240
[58] Field of Search ............ 350/354, 370, 353, 96.12; 359/288, 240, 241, 301; 385/4

[56] References Cited

U.S. PATENT DOCUMENTS

| | | | |
|---|---|---|---|
| 3,434,779 | 3/1969 | Damen et al. | 350/353 |
| 4,262,198 | 4/1981 | Gupta et al. | 350/353 |
| 4,508,431 | 4/1985 | Henshaw | 350/354 |
| 4,772,785 | 9/1988 | Cheng et al. | 350/354 |
| 4,856,860 | 8/1989 | Silberberg et al. | 350/96.12 |
| 4,880,296 | 11/1989 | Ditman, Jr. | 350/354 |

*Primary Examiner*—Andrew J. James
*Assistant Examiner*—S. V. Clark
*Attorney, Agent, or Firm*—Harvey Fendelman; Thomas Glenn Keough

[57] ABSTRACT

A thermal lensing material deflects a signal laser beam in accordance with the changing intensity of a contol beam. The intensity of the control laser beam creates a thermal lense effect to vary the refractive index of the crystal to responsively displace the signal laser beam. The relative orientations of the beams to the crystal and the degree to which the two laser beams are parallel to the optic axis also may be introduced as variables to effect the degree of displacement of the signal laser beam.

16 Claims, 1 Drawing Sheet

INTENSITY DEPENDENT BEAM DEFLECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Conventional beam deflection beam techniques usually rely upon the electronic control of either a mechanical device, such as a mirror, or an electro-optic device. Because of inertial constraints and the other problems associated with the mechanical approaches, optical techniques have shown promise to be to be more satisfactory.

Known techniques for optical deflection use optical or acoustic gratings so that beam deflection is accomplished by changing the grating spacing, by moving one of the grating beams or by changing the wavelength of the beam which influences a crystal to change its induced grating. The reliabilities of a number of the contemporary schemes, since they may partially rely on mechanical devices, often are compromised particularly in the case of higher frequency applications, since the associated electromechanical and electronic devices may not fulfill all expectations. As a consequence, the hoped-for optical deflection precision is not attained.

A number of thermal lensing techniques for purposes other than this inventive concept are well known which rely on various phenomena to focus beams but usually deleterious side effects occur, such as damage to some elements and beam distortions.

Thus, there exists a continuing need in the state of the art for an optical deflection scheme that avoids the use of associated electronic or mechanical devices to accomplish a signal beam deflection at relatively large deflection angles.

SUMMARY OF THE INVENTION

The present invention is directed to providing an apparatus and method for optically deflecting a signal laser beam in proportion to the intensity of an optical control beam. An optical control beam and an optical signal beam are directed in near proximity to each other in a thermal lensing material, such as a crystal, a transparent liquid or a gas. This condition assures a changing of the intensity of the optical control beam to effect a thermal lensing in the thermal lensing material and thereby change its refractive index to appropriately deflect the optical signal beam. The method of deflecting an optical signal beam in a thermal lensing material (in proportion to the intensity of an optical control beam) calls for the providing of the optical signal beam and the generating of the optical control beam to allow the directing of the optical signal beam and the optical control beam to at least a near proximity of each other in the thermal lensing material.

A prime object of the invention is to provide an apparatus and method for optically deflecting a signal laser beam.

Another object of the invention is to provide an apparatus and method for optically deflecting a signal laser beam with an optical control beam that creates a thermal lense effect in a thermal lensing material.

Another object of the invention is to provide an apparatus and method for optically deflecting a signal laser beam with appropriate intensity modulation of an optical control beam in a thermal lensing material.

Another object is to provide an optical deflection of a signal laser beam dependent on the polarization of a control laser beam with respect to the material possessing an optic axis.

Another object is to provide an optical deflection of a signal laser beam dependent on the intensity of a control laser beam appropriately polarized with respect to the optic axis of a thermal lensing material which possesses an optic axis.

A further object is to provide an intensity dependent deflection of a signal laser beam in which the control beam is polarized parallel to the optic axis of a thermal lensing material.

Yet another object is to provide an intensity dependent deflection scheme to attain a relatively large angular deflection of up to about 6°.

Yet another object is to provide an intensity dependent deflection of a signal laser beam in which the control beam is polarized parallel to the optic axis of a thermal lensing material and in which the signal beam has at least a component thereof optionally is polarized parallel to the optic axis of the thermal lensing material.

Yet a further object is to provide an intensity dependent deflection of a signal laser beam in which the control beam is polarized parallel to the optic axis of a thermal lensing material and in which the signal beam has at least a component thereof optionally is polarized parallel to the optic axis of the thermal lensing material and both beams can have a variety of angular orientations with respect to a surface of the thermal lensing material.

These and other objects of the invention will become more readily apparent from the ensuing specification when taken in conjunction with the appended claims and drawings.

DESCRIPTION OF THE PREFERRED EMBODIMENT

Figure 1:
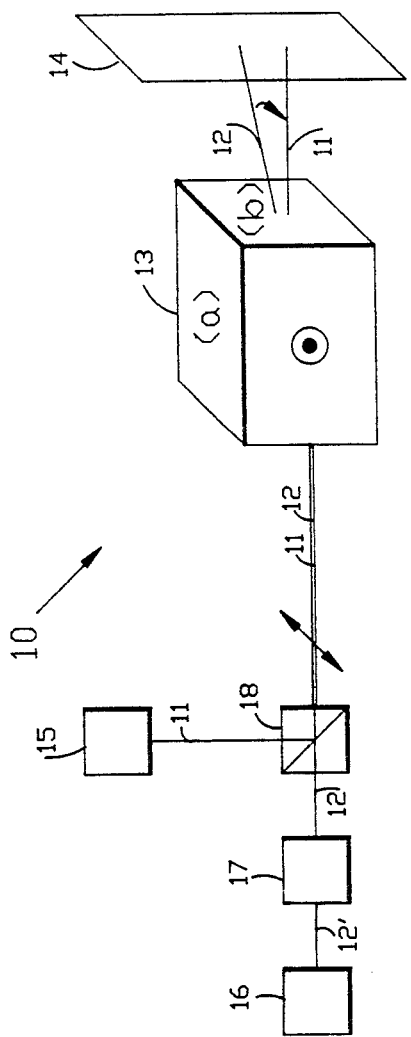
FIG. 1 is a schematic depiction of principal constituents of the invention.

Referring to FIG. 1, a beam deflector 10 deflects a signal beam 11 over a half angle of up to about 6° with respect to a control beam 12. Deflection of the signal beam with respect to the control beam occurs in a thermal lensing material 13 including liquids, solids and gases which exhibit thermal lensing.

A crystal with an optic axis was chosen for the purposes of explaining this inventive concept to show an acceptable beam deflection and is oriented to present its optical axis perpendicular to the propagation angle of the signal and control beams. In other words, the optical axis of crystal 13 goes into the paper with respect to the left-to-right direction of travel of the signal and control beams. The crystal chosen for the beam deflector more preferably is strontium barium niobate (SBN). Other photorefractive crystals also possess this beam deflection capability, such as barium titanate ($BaTiO_3$); however, the deflection angles were smaller than with the SBN. Bismuth silicon oxide (BSO) does not have an identifiable optical axis and could be used and is mentioned as an example of a material that does exhibit thermal lensing along with a number of other materials not mentioned herein to avoid belaboring the obvious.

Signal beam 11 may come from a suitably modulated laser source 15 which may have any polarization state; however, it is found that when the thermal lensing material possesses an optic axis, a maximum deflection efficiency occurs when the signal beam is polarized parallel to the optic axis of a crystal if one has been selected as the thermal lensing material. Polarization may be inherent, such as by including Brewster windows or other well known means to polarize the signal beam. The technique selected to modulate the signal laser source can be any of a number of known processes and wavelengths and energies can be tailored to suit the task at hand.

Control beam 12 comes from an appropriate control beam laser source 16 which is likely to be provided with Brewster windows in accordance with accepted designs to polarize the control beam. Other inherent polarizers may be included with source 16 without departing from the scope of this inventive concept. In this example, the control beam laser source is oriented so that its polarized control beam 12' is parallel to the optic axis of thermal lensing material 13. Control beam 12' coming from source 16 is appropriately intensity modulated by a suitable intensity modulator 17 so that control beam 12 can responsively deflect signal beam 11 over a desired deflection angle. The intensity modulator may have the capability to alter the shape of the control beam to more selectively affect the thermal lensing effect in the thermal material. This shape control is routinely performed by suitable lense and/or iris arrangements. The intensity modulation may be performed by well known acousto-optic means. Optionally, an intensity modulation could be caused in the control signal laser source by simply increasing and decreasing the driving power and so a suitable power control might do for some applications. Rotation of the polarization of the control beam is yet another way to change the deflection. It is here to be noted that the control beam and the signal beam do not need to be at the same wavelength.

A beam splitter 18 has been depicted for receiving both control beam 12 and signal beam 11 and directing them to the thermal lensing material, it is understood that other arrangements of the beam sources could be used, such as an in-line arrangement or a multiple mirror arrangement to direct the beams onto the thermal lensing material.

The control beam and/or the signal beam could be oriented at relative different angles to the faces of the thermal lensing material. A maximum deflection efficiency can occur when both the control beam and signal beam are polarized parallel to the optical axis of the thermal lensing material.

In accordance with this embodiment of this inventive concept, both beams propagate perpendicular to the optical axis of the crystal. The control beam can be polarized parallel to the optic axis so that the control beam maximizes a phenomenon which is referred to as thermal lensing. That is to say, control beam 12 actually heats thermal lensing material 13 to change the crystal's refractive index and so deflect the signal beam.

This creates a large index gradient for deflection of the signal beam. Usually, the signal beam is collinear or closely adjacent to the control beam so that a refractive deflection of the signal beam occurs on the fringe of the control beam's index gradient.

The beam deflection angle of the signal beam with respect to the control beam depends on the temperature dependence of the refractive index of the thermal lensing material 13 and the overall intensity of the control beam and its intensity profile which effect the thermal gradient. The possible configurations of beam orientations are for beams incident at any angle to the crystal faces. A maximum deflection efficiency has been noted when the signal beam is polarized parallel to the optic axis of the thermal lensing material if the material has an optic axis. The control beam and the signal beam do not need to be at the same wavelength.

A viewing screen 14 is represented in the drawing to provide a visual indication of beam deflection. It is certainly understood that other optically responsive elements could be substituted for the screen, such as photosensors, readouts or opto-electronic waveguides and their associated equipments, that would process or otherwise act on the refracted beam in a multitude of applications.

Figure 2:
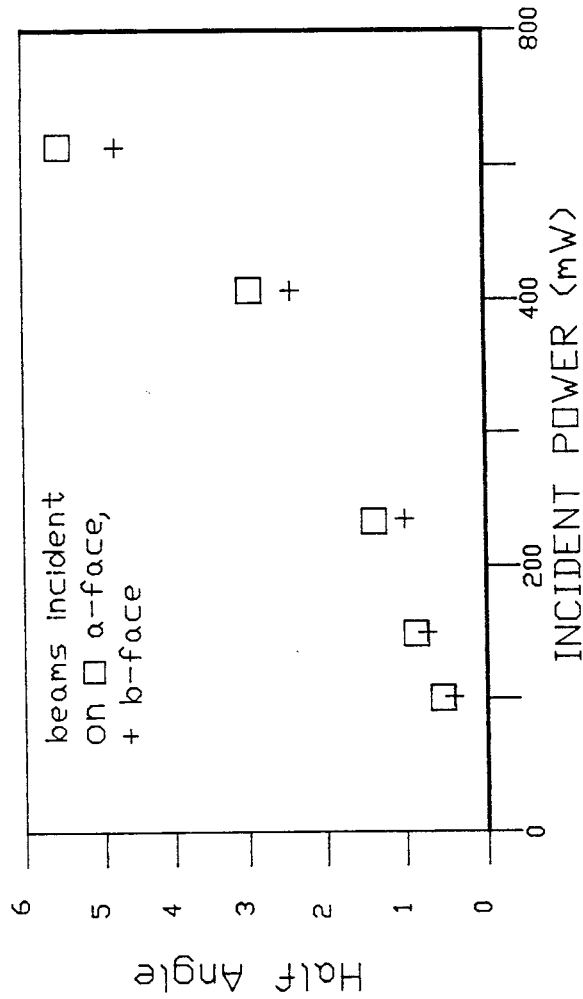
FIG. 2 depicts a representation of signal beam deflection being a function of control beam intensity with the beams impinging on two different faces of the crystal which are orthogonal to the optical axis of the crystal.

The beam deflections for increasing intensity of the control beam are depicted in FIG. 2 and show that when the incident power of the control beam is increased over the range of 100-155 milliwatts the signal beam is deflected up to about 6 degrees. The traces show what happens when the incident power of both the control beam and the signal beam impinge orthogonally on the (a) face and (b) face. For reasons not completely understood, it is not entirely clear if the phenomenon of thermal lensing alone is responsible for the deflection of the signal beam since different deflections of the signal beam were noted when a photorefractive crystal was used as thermal lensing material 13 and was rotated 90° so that the beams impinged on faces (a) and (b). These discrepancies in the deflections lead to the conclusion that other effects, in addition to the thermal lensing, may be present to alter the relative deflections when the beams impinge on one face or the other face.

It has also been discovered that changing the polarization of the control beam affects the amount of deflection of the signal beam in a material having an optical axis. This capability gives designers more flexibility using this concept.

Changing the orientation of the signal beam with respect to the control beam also has been noted to produce circular traces and other polar variations about the axis of the control beam and may prove a useful adaptation for an increasing variety of optical signal processing needs.

It is to be herein understood that referenced to the term optical signal beam and optical control beam does not necessarily restrict itself to those electromagnetic propagations which are visible to the eye. The deflection by the thermal lensing materials is also intended to encompass those emissions in the infrared and ultraviolet spectrum as well as that portion of the spectrum which is usually understood to be optical.

Obviously, many modifications and variations of the present invention are possible in the light of the above teachings. It is therefore to be understood that within the scope of the appended claims the invention may be practiced otherwise than as specifically described.

We claim:

1. An apparatus for deflecting an optical signal beam without the divergence thereof in proportion to the intensity of an optical control beam comprising:

a thermal lensing material having the property of changing its index of refraction in response to being appropriately heated;

means for providing said optical signal beam passing through said thermal lensing material;

means for generating said optical control beam being oriented to direct said optical control beam to the proximity of said optical signal beam passing through said thermal lensing material, the generating means providing said optical control beam at a sufficient intensity to effect the heating of said thermal lensing material to effect said deflecting of said optical signal beam without said divergence thereof in said proportion to said intensity of said optical control beam; and means operatively disposed with respect to said generating means for changing said intensity of said optical control beam to effect the heating of said thermal lensing material to appropriately effect said deflecting of said optical signal beam without said divergence thereof in said proportion to said intensity of said optical control beam.

2. An apparatus according to claim 1 in which the changing means sufficiently changes said intensity of said optical control beam to effect a thermal lensing in said thermal lensing material and thereby change its refractive index.

3. An apparatus according to claim 2 further including:

means operatively disposed with respect to said generating means and said providing means for directing said optical control beams and said optical signal beam to at least a near proximity of each other in said thermal lensing material.

4. An apparatus according to claim 3 in which said thermal lensing material is provided with an optical axis and said generating means is a laser provided with a polarizing element to assure that said optical control beam is polarized parallel with said optical axis of said thermal lensing material.

5. An apparatus according to claim 4 in which said providing means is a laser provided with a polarizing element to assure that at least a component of said optical signal beam is polarized parallel with said optical axis of said thermal lensing material.

6. An apparatus according to claims 1, 2, 3, 4, or 5 in which said thermal lensing material is provided with an optical axis, the optical signal beam providing means produces said optical signal beam that has at least a component thereof parallel with said optical axis of said thermal lensing material and the optical control beam generating means produces said optical control beam being polarized parallel with said optical axis of said thermal lensing material.

7. An apparatus according to claim 1, 2, 3 ,4, or 5 in which said thermal lensing material is a photorefractive crystal.

8. An apparatus according to claims 1, 2, 3, 4, or 5 in which said thermal lensing material is provided with an optical axis, the optical signal beam providing means produces said optical signal beam that has at least a component thereof parallel with said optical axis of said thermal lensing material and the optical control beam generating means produces said optical control beam being polarized parallel with said optical axis of said thermal lensing material and in which said thermal lensing material is a photorefractive crystal.

9. A method of deflecting an optical signal beam without the divergence thereof in a thermal lensing material having the property of changing its index if refraction in response to being appropriately heated in proportion to the intensity of an optical control beam comprising:

providing said optical signal beam passing through said thermal lensing material;

generating said optical control beam passing through said thermal lensing material at a sufficient said intensity to effect the heating of said thermal lensing material to effect said deflecting of said optical signal beam without said divergence thereof in said proportion to said intensity of said optical control beam;

directing said optical signal beam and said optical control beam to at least a near proximity of each other in said thermal lensing material; and changing the intensity of said optical control beam to appropriately effect said deflecting of said optical signal beam without said divergence thereof in said proportion to said intensity of said optical control beam.

10. A method of deflecting an optical signal beam in a thermal lensing material according to claim 9 in which the step of changing the intensity of said optical control beam is to such said intensity to effect a thermal lensing in said thermal lensing material and thereby change its refractive index.

11. A method of deflecting an optical signal beam in a thermal lensing material according to claim 10 in which said thermal lensing material is provided with an optical axis and there is the providing of a polarizing element optically associated with the step of providing said optical control beam to assure that said optical control beam is polarized parallel with said optical axis of said thermal lensing material.

12. A method of deflecting an optical signal beam in a thermal lensing material according to claim 11 which said there is the providing of a polarizing element to assure that at least a component of said optical signal beam is polarized parallel with said optical axis of said thermal lensing material.

13. A method of deflecting an optical signal beam in a thermal lensing material according to claim 12 in which the thermal lensing material has an optical axis and a change of deflection is effected by the changing of the polarization of the control beam.

14. A method of deflecting an optical signal beam in a thermal lensing material having an optical axis according to claim 9, 10, 11, 12 or 13 in which the step of optical signal beam providing produces said optical signal beam to have at least a component thereof parallel with said optical axis of said thermal lensing material, the step of optical control beam generating produces said optical control beam being polarized parallel with said optical axis of said thermal lensing material.

15. The method according to claim 9, 10, 11, 12 or 13 in which said thermal lensing material is a photorefractive crystal.

16. A method of deflecting an optical signal beam in a thermal lensing material having an optical axis according to claim 9, 10, 11, 12 or 13 in which the step of optical signal beam providing produces said optical signal beam to have at least a component thereof parallel with said optical axis of said thermal lensing material, the step of optical control beam generating produces said optical control beam being polarized parallel with said optical axis of said thermal lensing material and in which the thermal lensing material is a photorefractive crystal.

* * * * *